April 15, 1947. R. R. GLASSBROOK 2,418,929
DIVIDED TUBE METAL BEAM STRUCTURE
Filed March 7, 1944

Inventor
Roland R. Glassbrook
By
Samuel H. Davis
Attorney

Patented Apr. 15, 1947

2,418,929

UNITED STATES PATENT OFFICE 2,418,929

DIVIDED TUBE METAL BEAM STRUCTURE

Roland R. Glassbrook, Lansing, Mich., assignor of one-fourth to Wayne Glassbrook, Lansing, Mich.

Application March 7, 1944, Serial No. 525,394

1 Claim. (Cl. 189—37)

This invention relates to what may be termed for purposes of description and explanation, a divided tube metal beam structure. The object is to provide for use in prefabricated metal constructions for buildings a beam made of all punch and die work, such as may be easily assembled on the job, with the idea of lightness and strength. It is intended to be made of non-rusting material, and can be of any guage. Provision can be made for secondary insulating boards by welding strips or lugs for same to the beams where desired. This invention may be made of two or three or any number of divided tubular members for strength. In this specification and application only two divided tubular end members are set forth.

In this invention it will be noted that various modifications are almost obvious to any mechanical man familiar with this form of building construction, therefore, several slightly changed forms of the parts are herein illustrated and described.

Of the accompanying drawings forming a part of this application for a patent,

Throughout the drawings and description the same number is used to refer to the same part.

Figure 1:
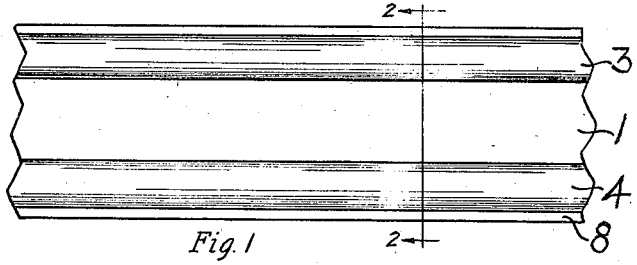
Fig. 1 is a side view of a beam fashioned in accordance with this invention.
Figure 2:
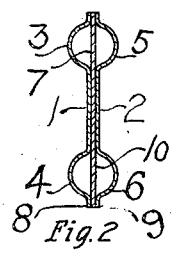
Fig. 2 represents a sectional view taken on the line 2—2 of Fig. 1.

Considering Figs. 1 and 2, it will be noted that the flat plate portions 1 and 2 connect the divided part cylindrical tubular hollow portions 3, 4, 5 and 6, and an interposed plate body 7 lies in contact and between the parts 1 and 2. It will also be observed in the Fig. 2 that the divided tubular end portions have slightly extended edges 8 and 9 and the edge portion 10 of the interposed plate is arranged between those edges or lips of the divided tubular portions.

Figure 3:
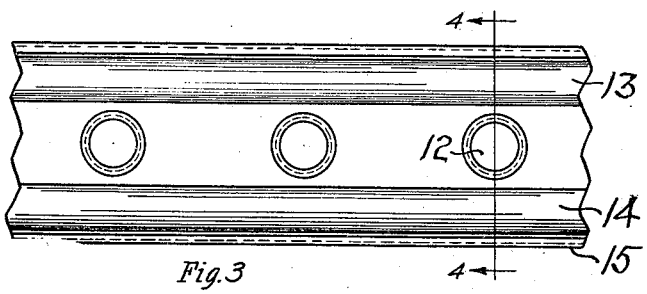
Fig. 3 illustrates a modified structure showing a side view of a beam made in accordance with this invention, and showing spaced openings through the flat plate body portions and interposed plate body that extends between the divided tubular ends of the members.
Figure 4:
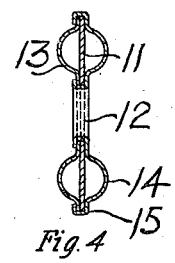
Fig. 4 shows a sectional view of the parts set out in Fig. 3, the section being taken on the line 4—4 of Fig. 3.

Considering Figs. 3 and 4, it will be seen that the interposed plate body member 11, as well as the divided tubular ends members 13 and 14 have openings through them and that the parts are secured together by the grommet portion 12 of the beam member 14. In this Fig. 4 it will be also noted that the edges 15 of the tubular ends member 14 are doubled over the edge of the interposed plate 11. The parts are thus additionally and more strongly secured together.

Figure 5:
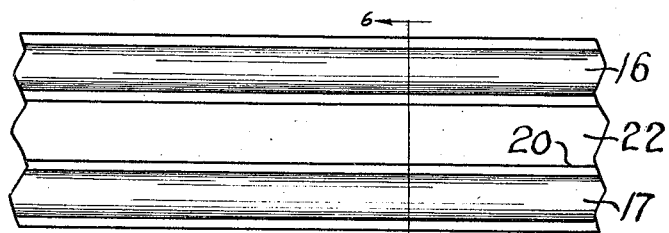
Fig. 5 is a side view of a beam including this invention showing an arrangement wherein the divided tubular end portions are not directly joined by the interposed flat plate member, but are placed oppositely in contact with an independent interposed plate body portion.
Figure 6:
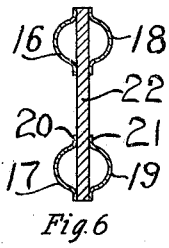
Fig. 6 is a sectional view taken on the line 6—6 of Fig. 5.

Considering Figs. 5 and 6, it will be observed that the divided tubular members 16, 17, 18 and 19 now have no individual connecting plate portion as in Fig. 2, but a heavier interposed plate is placed between the lips 20 and 21 of the divided tubular ends 18 and 19, and the interposed plate bears reference number 22.

Figure 7:
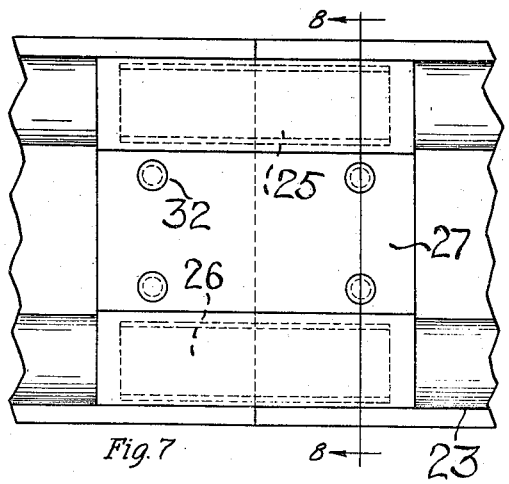
Fig. 7 represents a side view of a beam under this invention showing the divided tubular ends members as in Fig. 2, a metal tube being located between the tubular ends and an outer additional divided tubular ends member exteriorly placed on each side of the beam and the whole riveted together.
Figure 8:
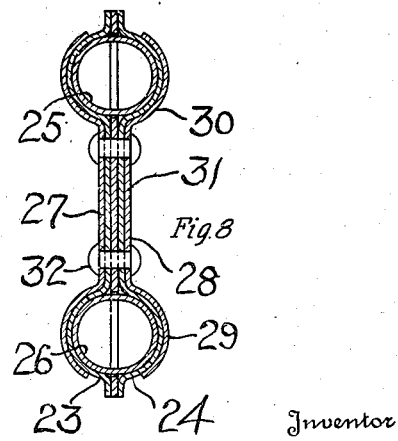
Fig. 8 illustrates a sectional view of the parts as set forth in Fig. 7, the section being taken on the line 8—8 of Fig. 7.

Considering Figs. 7 and 8, it is therein set forth that the divided tubular ends members 23 and 24 have located within the said ends the tubes 25 and 26, and that similar divided tubular ends members 27 and 28 are exteriorly placed, the divided ends of which are referred to by numbers 29 and 30. Each of the exterior members 27 and 28 has the connecting flat portion 31, but no lips or edge projections such as 8 and 9 of Fig. 2. The exterior and inner divided tubular end members are riveted together by the rivets 32, thereby clamping in place the inserted tubes 25 and 26.

The operation of this invention is believed to have been made clear from the foregoing description. Holes of various sizes can be provided anywhere in the beam for conduits, or pipes or the like without weakening the beam. For additional strength the dividing plate of the tubes may be corrugated.

When greater rigidity is needed than can be had by use of the plain divided tubular structure, the outer wall of the tube or tubes will be corrugated, and the section of the plate within the tubular formation will be embossed with alternating convex and concave features associated or engaged by one another.

Having now described this invention I claim:

A beam construction of the character described, comprising members having part cylindrical tubular portions, two of said members being placed opposite each other whereby said part tubular portions form tubular side edge passages in the beam, a flat plate member arranged between the said part tubular members, externally placed part tubular members arranged in contact with the said part tubular inner members, tubes extending internally within and between the part tubular portions of the said inner located part tubular members, and the said inner and outer part tubular members and the said interposed plate member being secured together by rivets passing through all of said members.

ROLAND R. GLASSBROOK.

REFERENCES CITED

The following references are of record in the file of this patent:

UNITED STATES PATENTS

| Number | Name | Date |
|---|---|---|
| 2,316,560 | Causey | Apr. 13, 1943 |
| 991,603 | Brooks | May 9, 1911 |
| 693,494 | Carnahan | Feb. 18, 1902 |